United States Patent Office 3,069,425
Patented Dec. 18, 1962

3,069,425
1-AROYLPROPYL-4-PYRIDYLPIPERIDIN-4-OL
Paul A. J. Janssen, Vosselaar, near Turnhout, Belgium, assignor to Research Laboratorium Dr. C. Janssen, N.V., Beerse, Belgium, a company of Belgium
No Drawing. Filed Apr. 27, 1960, Ser. No. 24,918
4 Claims. (Cl. 260—294.7)

The present invention relates to 1-aroylpropyl-4-pyridylpiperidin-4-ol of the general structural formula

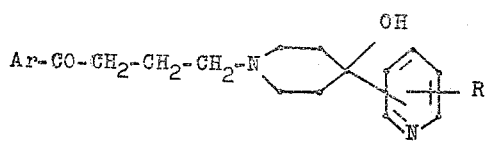

and the pharmaceutically useful non-toxic salts thereof; wherein Ar is a phenyl, tolyl, halophenyl, or anisyl radical and R is a hydrogen or methyl radical.

The halophenyl radical represented can be a fluorophenyl, a chlorophenyl, a bromophenyl, or an iodophenyl radical.

The compounds of this invention are potent depressors of the central nervous system. More specifically, they are barbiturate potentiators. These compounds also exhibit useful properties as hypnotics, appetite inhibitors and analgesics.

The organic bases of this invention form pharmaceutically acceptable salts with a variety of inorganic and strong organic acids including sulfuric, phosphoric, hydrochloric, hydrobromic, hydriodic, sulfamic, citric, lactic, maleic, malic, succinic, tartaric, cinnamic, acetic, benzoic, gluconic, ascorbic, and related acids. They also form quaternary ammonium salts with a variety of organic esters of sulfuric, hydrohalic, and aromatic sulfonic acids. Among such esters are methyl chloride and bromide, ethyl chloride, propyl chloride, butyl chloride, isobutyl chloride, benzyl chloride and bromide, phenethyl bromide, naphthylmethyl chloride, dimethylsulfate, diethylsulfate, methyl benzenesulfonate, ethyl toluenesulfonate, ethylene chlorohydrin, propylene chlorohydrin, allyl bromide, methallyl bromide and crotyl bromide.

The compounds of this invention are prepared by the condensation of an aroylpropyl halide of the formula Ar—CO—CH$_2$—CH$_2$—CH$_2$—Halogen with an appropriately selected 4-pyridylpiperidin-4-ol. This reaction can be carried out in an inert solvent such as an aromatic hydrocarbon (e.g. benzene, toluene, xylene), a lower alkanol (e.g. ethanol, propanol, butanol), or a lower alkanone (e.g. acetone, butanone, pentanone). The reaction may be usefully accelerated by elevated temperatures.

The compounds which constitute this invention and their methods for preparation will appear more fully from a consideration of the following examples, which are given for the purpose of illustration only and are not to be construed as limiting the invention in spirit or in scope. In these examples, quantities are indicated in parts by weight, temperatures in degrees centigrade (° C.), and pressures in millimeters of merucry (mm.).

Example 1

Under a nitrogen atmosphere, 10.5 parts of lithium are suspended in 120 parts of anhydrous ether. To this solution are added 98.6 parts of n-butyl bromide portionwise. The mixture is cooled to −18° C., stirred for 45 minutes at that temperature, and then cooled to −35° C. At this temperature, 72.5 parts of 2-bromopyridine in 160 parts of anhydrous ether are added portionwise. The red solution is then stirred for 10 minutes, cooled to −50° C., and then 32.5 parts of 1-benzyl-4-piperidone in 160 parts of dry ether are added. The cooling bath is then removed and the mixture is decomposed by the portionwise addition of water and hydrochloric acid. The layers are separated and saved. The ether layer is extracted with hydrochloric acid. The extract is combined with the aqueous layers saved from above, rendered alkaline, and then extracted with diisopropyl ether. This extract is dried and hydrogen chloride gas is passed through the solution. The sticky solid which precipitates is separated by decantation and then treated with acetone. After standing, a solid precipitate is obtained. To this mixture is added acetone and 2-propanol. The resulting mixture is boiled for an hour and the undissolved solid is collected and dried to yield 1-benzyl-4-(2-pyridyl)-piperidin-4-ol dihydrochloride melting at about 266–267.8° C. The hydrochloride of this compound is obtained in a similar manner.

The free base of 1-benzyl-4-(2-pyridyl)piperidin-4-ol hydrochloride is liberated by dissolving 112.8 parts of the salt in water, rendering the solution alkaline, extracting the solution with chloroform, and drying the extract. To 48 parts of cyanogen bromide in 320 parts of chloroform is added slowly at a temperature of 20–24° C. the extract from above. The mixture is then heated slowly to a refluxing temperature and then refluxed for 150 minutes. After stirring overnight at room temperature, the mixture is extracted twice with dilute hydrochloric acid. The extracts are combined, rendered alkaline, and then filtered. Both the filtrate and the precipitate are saved. The filtrate is extracted with a solution of ether and chloroform. The organic extract is dried and evaporated. The residue is combined with the preciptate saved from above, recrystallized from water, and decolorized with activated charcoal to yield 1-cyano-4-(2-pyridyl)piperidin-4-ol melting at about 111–112° C.

A mixture of 24.5 parts of this compound and 543 parts of 6% hydrochloric acid is refluxed for 20 hours, boiled with activated charcoal, and filtered. The filtrate is then rendered alkaline, saturated with potassium carbonate, and extracted exhaustively with ether. After drying, hydrogen chloride gas is passed through the ethereal extract. The liquid is first decanted from the precipitate which is saved, and then evaporated. The residue is combined with the precipitate and then boiled in a 2:1 mixture of 2-propanol and acetone. The insoluble material is collected and then purified by the following procedure. The material is first dissolved in warm water, treated with activated charcoal, and cooled. This solution is then saturated with potassium carbonate and extracted with chloroform. The extract is evaporated and the residue recrystallized by chilling at −20° C. from a 4:1 mixture of ether and ethanol to yield 4-(2-pyridyl)-piperidin-4-ol melting at about 153.7–155.6° C.

A mixture of 2.36 parts of γ-chlorobutyrophenone, 5 parts of 4-(2-pyridyl)piperidin-4-ol, 0.1 part of potassium iodide, and 80 parts of toluene is heated in a sealed tube for 72 hours at 140° C., cooled, and then filtered. To the filtrate is added ether. This solution is then washed with water, dried, and saturated with hydrogen chloride gas. The oil which forms is separated from the organic solution and saved. After evaporation of the organic solution the residue is combined with the oil saved from above and triturated with acetone. The solid which forms is purified by boiling in 2-propanol to yield 1-(γ - benzoylpropyl) - 4 - (2-pyridyl)piperidin-4-ol dihydrochloride melting at about 232–233.3° C.

By substituting 2-bromo-5-methylpyridine in the procedure of this example, 1-(γ-benzoylpropyl)-4-(5-methyl-2-pyridyl)piperidin-4-ol dihydrochloride is obtained. The compound has the formula

$$\langle\!\!\!\bigcirc\!\!\!\rangle\!\!-\!CO\!-\!CH_2\!-\!CH_2\!-\!CH_2\!-\!N\!\!\overbrace{\phantom{xxx}}^{OH}\!\!\overbrace{\phantom{xx}}_{CH_3}^{N}\quad .2HCl$$

Example 2

By substituting 3-bromopyridine for 2-bromopyridine in the procedure of Example 1, 4-(3-pyridyl)-piperidin-4-ol is obtained.

A mixture of 3 parts of γ-chlorobutyrophenone, 5 parts of 4-(3-pyridyl)piperidin-4-ol, 0.1 part of potassium iodide, and 80 parts of toluene is heated in a sealed tube for 72 hours at 140° C. After cooling, the mixture is filtered and ether is added to the filtrate. This solution is then washed with water and dried. Hydrogen chloride gas is added and the oil which forms is separated from the solution and saved. The organic solution is then evaporated and the residue is combined with the oil saved from above. The mixture is triturated with acetone and the solid which forms is purified by boiling in 2-propanol to yield 1-(γ-benzoylpropyl)-4-(3-pyridyl)piperidin-4-ol dihydrochloride of the structural formula $$\langle\!\!\!\bigcirc\!\!\!\rangle\!\!-\!CO\!-\!CH_2\!-\!CH_2\!-\!CH_2\!-\!N\!\!\overbrace{\phantom{xxx}}^{OH}\!\!\overbrace{\phantom{xx}}_{N}\quad .2HCl$$

Example 3

To a suspension of 341 parts of aluminum chloride in 1740 parts of carbondisulfide are added 96 parts of fluorobenzene with stirring and cooling. While the temperature is maintained at about 10° C., 141 parts of γ-chlorobutyrylchloride are added. The cooling bath is then removed and the stirring is continued for 2 hours. The mixture is poured into ice-water and the layers are separated. The organic layer is washed with water, dried, and concentrated under reduced pressure. The residue is distilled to yield γ-chloro-4-fluorobutyrophenone boiling at about 136–142° C. at 6 mm. pressure.

By substituting 3 parts of the above product for γ-chlorobutyrophenone in the procedure of Example 1, 1 - [γ - (4-fluorobenzoyl)propyl]-4-(2-pyridyl)piperidin-4-ol dihydrochloride melting at about 229–231° C. with decomposition is obtained.

Example 4

By substituting 2-bromo-3-methylpiperidine for 2-bromopyridine in the first paragraph of Example 1 and otherwise following the procedure outlined in paragraphs 1, 2, and 3 of that example, 4-(3-methyl-2-pyridyl)piperidin-4-ol is obtained.

To a mixture of 4.1 parts of 4-(3-methyl-2-pyridyl)piperidin-4-ol, 6.6 parts of sodium carbonate, 0.1 part of potassium iodide in 104 parts of 4-methyl-2-pentanone are added 5.9 parts of γ-chloro-4-fluorobutyrophenone portionwise. The mixture is then refluxed for 36 hours, cooled and partitioned between water and ether. The ethereal layer is separated, dried, and evaporated. The oily residue is dissolved in ether. After drying, the solution is saturated with hydrogen chloride gas. The solid which precipitates is collected on a filter, triturated with acetone, and dried to yield 1-[γ-(4-fluorobenzoyl)propyl]-4-(3 - methyl - 2 - pyridyl)piperidin-4-ol dihydrochloride melting at about 234.5–240° C. with decomposition.

Example 5

To a Grignard reagent of 3-fluorophenyl magnesium bromide prepared from 6.7 parts of magnesium and 94.5 parts of 3-bromofluorobenzene in 80 parts of ether are added 21 parts of γ-chlorobutyrylnitrile in 64 parts of ether. This mixture is refluxed under nitrogen for 2 hours with stirring. After standing at room temperature for 15 hours, the excess Grignard reagent is decomposed by the addition of 56 parts of concentrated hydrochloric acid and 50 parts of water. The organic layer is separated, dried, and concentrated under reduced pressure. The residue is distilled to yield γ-chloro-3-fluorobutyrophenone boiling at about 105–125° C. at 2 mm. pressure.

By substituting the above product for γ-chloro-4-fluorobutyrophenone in the procedure of Example 4, 1-[γ-(3-fluorobenzoyl)propyl] - 4 - (3-methyl-2-pyridyl)-piperidin-4-ol dihydrochloride of the structural formula $$\text{F}\!\!-\!\!\langle\!\!\!\bigcirc\!\!\!\rangle\!\!-\!CO\!-\!CH_2\!-\!CH_2\!-\!CH_2\!-\!N\!\!\overbrace{\phantom{xxx}}^{OH}\!\!\overbrace{\phantom{xx}}_{CH_3}^{N}\quad .2HCl$$

is obtained.

By substituting an equimolar amount of bromobenzene in the procedure of Example 4, 1-[γ-(4-bromobenzoyl)-propyl]-4-(3-methyl-2-pyridyl)piperidin - 4 - ol dihydrochloride is obtained.

Example 6

By substituting toluene for fluorobenzene in the first paragraph of Example 3, γ-chloro-4-methylbutyrophenone is obtained.

By substituting this compound for γ-chlorobutyrophenone in the procedure of Example 1, 1-[γ-(4-methylbenzoyl)propyl]-4-(2-pyridyl)piperidin-4-ol dihydrochloride of the structural formula $$CH_3\!\!-\!\!\langle\!\!\!\bigcirc\!\!\!\rangle\!\!-\!CO\!-\!CH_2\!-\!CH_2\!-\!CH_2\!-\!N\!\!\overbrace{\phantom{xxx}}^{OH}\!\!\overbrace{\phantom{xx}}_{N}\quad .2HC$$

is obtained.

Example 7

By substituting anisole for fluorobenzene in the procedure of the first paragraph of Example 3, γ-chloro-4-methoxybutyrophenone is obtained. This compound is then substituted for γ-chlorobutyrophenone in the procedure of Example 1 to obtain 1-[γ-(4-anisoyl)propyl]-4-(2-pyridyl)piperidin-4-ol dihydrochloride of the structural formula $$CH_3O\!\!-\!\!\langle\!\!\!\bigcirc\!\!\!\rangle\!\!-\!CO\!-\!CH_2\!-\!CH_2\!-\!CH_2\!-\!N\!\!\overbrace{\phantom{xxx}}^{OH}\!\!\overbrace{\phantom{xx}}_{N}$$

What is claimed is:

1. A compound of the formula $$Ar\!-\!CO\!-\!CH_2\!-\!CH_2\!-\!CH_2\!-\!N\!\!\overbrace{\phantom{xxx}}^{OH}_{B}$$

wherein Ar is a member of the class consisting of phenyl, tolyl, halophenyl, and anisyl and B is a member of the class consisting of pyridyl and methylpyridyl.

2. 1-(γ-benzoylpropyl)-4-(2-pyridyl)piperidin-4-ol.
3. 1-[γ-(4-fluorobenzoyl)propyl]-4-(2 - pyridyl)piperidin-4-ol.
4. 1-[λ-(4 - fluorobenzoyl)propyl]-4-(3-methyl-2-pyridyl)piperidin-4-ol.

References Cited in the file of this patent

UNITED STATES PATENTS 2,807,585     Gardner et al.            Sept. 24, 1957

FOREIGN PATENTS 156,422     Switzerland             Oct. 9, 1956

UNITED STATES PATENT OFFICE
CERTIFICATE OF CORRECTION

Patent No. 3,069,425                          December 18, 1962

Paul A. J. Janssen

It is hereby certified that error appears in the above numbered patent requiring correction and that the said Letters Patent should read as corrected below.

Column 4, lines 33 to 38, the formula should appear as shown below instead of as in the patent:

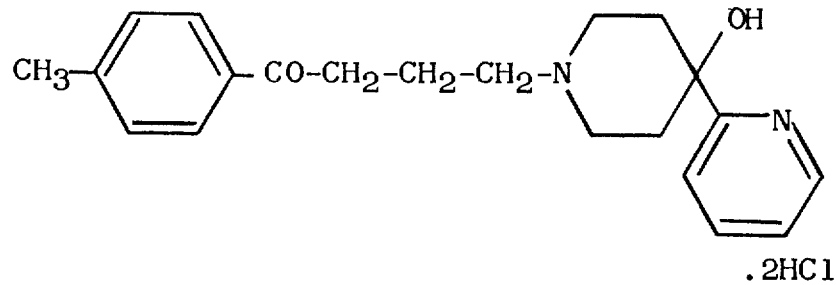

lines 50 to 53, for that portion of the formula reading

same column 4, line 66, for "1-[λ-(4-" read -- 1-[γ-(4- --.

Signed and sealed this 5th day of May 1964.

(SEAL)
Attest:

ERNEST W. SWIDER                          EDWARD J. BRENNER
Attesting Officer                          Commissioner of Patents